(12) United States Patent
Lee et al.

(10) Patent No.: US 7,039,255 B2
(45) Date of Patent: May 2, 2006

(54) METHOD FOR SEARCHING MULTIMEDIA USING PROGRESSIVE HISTOGRAM

(75) Inventors: Jin-Soo Lee, Seoul (KR); Heon-Jun Kim, Sung-Nam-shi (KR); Jung Min Song, Seoul (KR)

(73) Assignee: LG Electronics Inc., Seoul (KR)

( * ) Notice: Subject to any disclaimer, the term of this patent is extended or adjusted under 35 U.S.C. 154(b) by 414 days.

(21) Appl. No.: 09/908,733

(22) Filed: Jul. 20, 2001

(65) Prior Publication Data

US 2002/0059206 A1 May 16, 2002

(30) Foreign Application Priority Data

Jul. 21, 2000 (KR) .............................. 2000-41811
Nov. 25, 2000 (KR) .............................. 2000-70690

(51) Int. Cl.
*G06K 9/60* (2006.01)
(52) U.S. Cl. ...................... 382/305; 382/168; 382/170; 382/171; 707/2; 707/3; 707/4
(58) Field of Classification Search ........ 382/168–176, 382/305; 707/2, 3, 4
See application file for complete search history.

(56) References Cited

U.S. PATENT DOCUMENTS

| | | | | |
|---|---|---|---|---|
| 4,959,870 | A * | 9/1990 | Tachikawa ................... | 382/253 |
| 5,802,361 | A * | 9/1998 | Wang et al. ................. | 382/217 |
| 6,163,622 | A * | 12/2000 | Abdel-Mottaleb et al. .. | 382/170 |
| 6,181,817 | B1* | 1/2001 | Zabih et al. ................. | 382/170 |
| 6,243,713 | B1* | 6/2001 | Nelson et al. ........... | 707/104.1 |
| 6,606,402 | B1* | 8/2003 | Wagman ..................... | 382/150 |

FOREIGN PATENT DOCUMENTS

| | | |
|---|---|---|
| EP | 1139269 A2 * | 10/2001 |
| JP | 63-000779 | 5/1988 |
| JP | 2000-187731 | 7/2000 |
| WO | WO 99/31605 | 6/1999 |
| WO | WO 00/31653 | 6/2000 |

OTHER PUBLICATIONS

Michael J. Swain and Dana H. Ballard, "color indexing", Jun. 6, 1991 □□International Journal of Computer Vision 7:1, 11-32.*
Chad Carson, Serge Belongie, Hayit Greenspan and Jitendra Malik, "Region-Based Image Querying", Jun. 20, 1997, University of California at Berkeley.*
Xia Wan and C.-C. Jay Kuo, "A New Approach to Image Retrieval with Hierarchical Color Clustering", Sep. 1998.*
Xia Wan and C.-C. Jay Kuo, "Color Distribution Analysis and Quantization for Image Retrieval", SPIE vol. 2670.*
Du-Sik Park et al. "Image Indexing Using Weighted Color Histogram" IEEE Comput. Soc, US, Sep. 27, 1999, XP010354258, ISBN: 0-7695-0040-4, pp. 909-914.
L. Cinque et al. "Color-Based Image Retrieval Using Spatial-Chromatic Histograms" IEEE Comput. Soc, US, vol. 2, Jun. 7, 1999, XP010519524, ISBN: 0-7695-0253-9, pp. 969-973.
Chie Hashizume et al. "Robust Object Extraction With Illumination-Insensitive Color Descriptions" IEEE Comput. Soc, US, vol. 3, Oct. 4, 1998, XP010586862, ISBN: 0-8186-8821-1, pp. 50-54.
S-F Chang et al. "Visual Information Retrieval From Large Distributed Online Repositories" Communications of the ACM, vol. 40, No. 12, Dec. 1997, XP000765720, ISSN: 0001 -0782, pp. 63-71.

* cited by examiner

*Primary Examiner*—Andrew W. Johns
*Assistant Examiner*—Patrick L. Edwards
(74) *Attorney, Agent, or Firm*—Fleshner & Kim, LLP

(57) ABSTRACT

A method of receiving or sending data. The data includes a chart (i.e., a histogram). The chart may be grouped into categories (i.e., bins). The order of the categories in the chart is according to the categories ability to discriminate.

4 Claims, 7 Drawing Sheets

```
int ValidIndex[184] ={
176,144,160,96,128,180,152,168,112,48,
178,182,148,156,164,172,104,120,136,72,
0,177,179,181,183,146,154,162,170,150,
158,166,174,100,108,116,124,132,140,56,
64,80,88,16,32,145,153,161,169,147,
155,163,171,149,157,165,173,151,159,167,
175,98,106,114,122,130,138,102,110,118,
126,134,142,52,60,68,76,84,92,8,
24,40,97,105,113,121,129,137,99,107,
115,123,131,139,101,109,117,125,133,141,
103,111,119,127,135,143,50,58,66,74,
82,90,54,62,70,78,86,94,4,12,
20,28,36,44,49,57,65,73,81,89,
51,59,67,75,83,91,53,61,69,77,
85,93,55,63,71,79,87,95,2,10,
18,26,34,42,6,14,22,30,38,46,
1,9,17,25,33,41,3,11,19,27,
35,43,5,13,21,29,37,45,7,15,
23,31,39,47};
```

Fig. 7

| Number of bins | Performance | Number of entire bins |
|---|---|---|
| 184 | 0.049 | 736 |
| 184 | 0.092 | 368 |
| 184 | 0.157 | 184 |
| 128 | 0.053 | 512 |
| 128 | 0.096 | 256 |
| 128 | 0.174 | 128 |
| 64 | 0.088 | 256 |
| 64 | 0.151 | 128 |
| 64 | 0.261 | 64 |
| 32 | 0.123 | 128 |
| 32 | 0.229 | 64 |
| 32 | 0.410 | 32 |
| 16 | 0.204 | 64 |
| 16 | 0.381 | 32 |
| 16 | 0.664 | 16 |

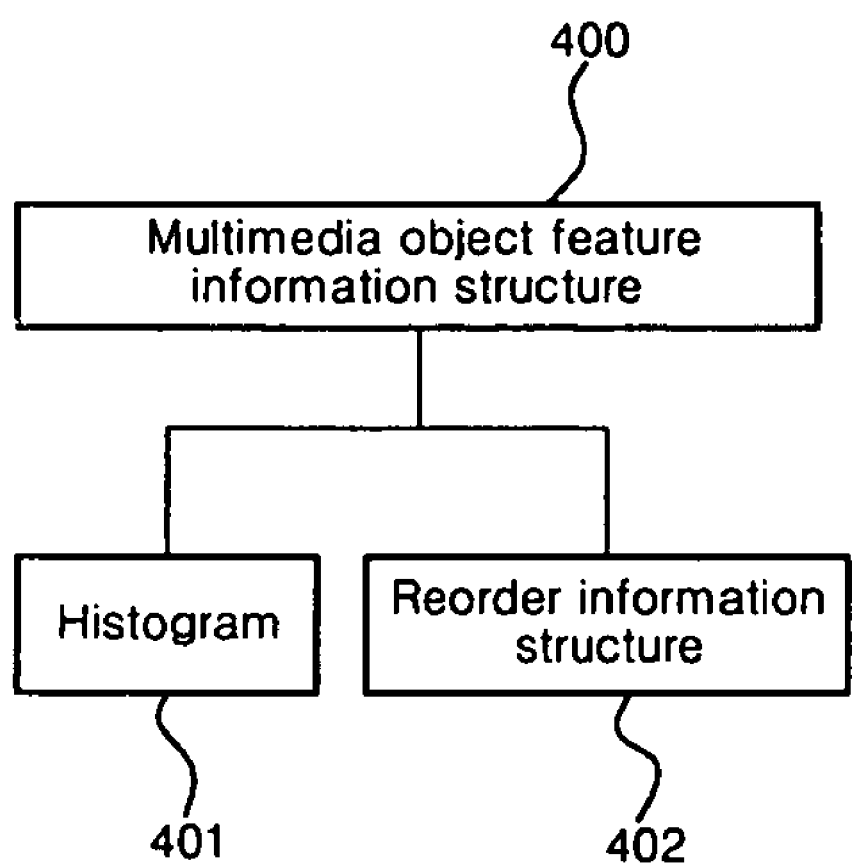

METHOD FOR SEARCHING MULTIMEDIA USING PROGRESSIVE HISTOGRAM

BACKGROUND OF THE INVENTION

1. Field of the Invention

The present invention relates to a method for searching data (i.e., an image) using a histogram.

2. Background of the Related Art

Images or pictures can be stored on a computer in digital form. Utilizing digital images is becoming increasingly popular. This popularity may be attributed to the low cost of producing digital images as compared to images taken with a conventional camera using film. One advantage is digital images can be distributed electronically via the Internet. Another attribute is that there is no incremental cost per image to produce the digital image by digital camera. Accordingly, a user of a digital camera may tend to take many pictures. Further, there is an enormous amount of digital images available to users via the Internet. It is often a great task for a user to locate a digital image through a search. Accordingly, search engines exist for searching for digital images. However, these search engines suffer from at least two disadvantages. One disadvantage is that not all images are represented in the same way for purposes of the search. For example, two images may be represented by a histogram for searching purposes, however the histograms utilize different protocols which are not compatible. Another disadvantage is that data relating to an image (i.e., a histogram) may be only partially transferred between computers on a network and cause that partial transfer of the histogram to be useless.

SUMMARY OF THE INVENTION

Objects of the present invention at least include overcoming the above-discussed disadvantages. Particularly, embodiments of the present invention allow for only portions of histograms to be used in queries.

Embodiments of the present invention relate to a method of receiving or sending data. The data includes a chart (i.e., a histogram). The chart may be grouped into categories (i.e., bins). The order of the categories in the chart is according to the categories ability to discriminate. For example, a histogram may have a plurality of bins. A histogram is a chart that can break down qualities of an image. For instance, a color histogram will have a chart which shows the distribution of different colors in an image. Each bin may correspond to a particular color. Further, some colors are more distinguishable than other colors. For instance, light blue, which is the color of the sky, is commonly seen in digital images. This is because many pictures are taken outdoors and light blue is very typical in many pictures. If a user attempts to search for a particular picture based on color, light blue will not be an effective bin as it is so common amongst so many pictures. However, the color of purple may not typically be in many images. Accordingly, a bin associated with purple may be very useful in a query for digital images where the target image contains a lot of purple. Accordingly, in accordance with embodiments of the present invention, a bin with a large quantity of purple would be positioned at the beginning of the chart.

In this example, by purple being positioned at the beginning of the chart, it can be transferred first in an image query over a network (i.e., the Internet). This way, when the chart is transferred, the most important information (the information with the strongest ability to discriminate) is transferred first and the search engine can utilize this information expediently to achieve an image search result. Likewise, in this example, a bin which represents light blue, would probably be transferred last, as it is not very useful in an image search because it has a low ability to discriminate.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 7 is a view illustrating an exemplary performance comparison when partial comparative comparison is executed.

FIG. 10 is an exemplary view illustrating feature information structure of a multimedia object formed of a histogram and reordered information.

DETAILED DESCRIPTION OF PREFERRED EMBODIMENTS

Figure 1:
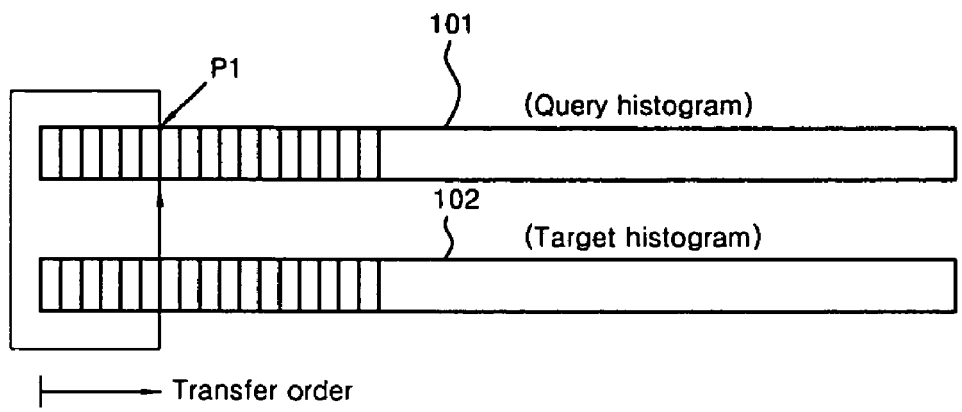
FIG. 1 is a view illustrating an exemplary histogram bin transfer stream.

In the present invention, comparative comparison using only parts of a histogram enables a high retrieval performance. Such a function is useful for a variety of uses. For example, the transfer of a histogram bit stream may be interrupted, due to a network environment, during the transfer of data of a histogram. In accordance with embodiments of the present invention, retrieval using only transferred parts of the histogram information ensures a high retrieval performance. For this purpose, even though retrieval is executed in the order of transfer of bins of the histogram, i.e., only by using N (N<number of bins of the entire histogram) bins by priority, a high retrieval performance can be preserved.

In another example, a server may transfer a portion of an entirety of a histogram to conform with the environment of a client or the environment of a network. Accordingly, optimized retrieval can be executed. For example, in circumstances that the retrieval is for use in data retrieval of an approximately similar kind or in the case that the network environment is very poor, retrieval can be executed without overworking the network environment while ensuring a minimum retrieval performance by transferring only parts of the histogram of data to be retrieved. On the contrary, in the case that the network or computer environment is excellent and an accurate retrieval is desired, the entire histogram can be transferred.

In order to provide the above function, it is necessary to optimize the histogram so that the retrieval performance is not compromised when only a portion of the bins of a histogram are retrieved. For this purpose, the histogram has to be reconfigured in the structure in which important bins (i.e., bins more affecting retrieval), are positioned at the beginning of a bit stream. Accordingly, the histogram can be optimized according to embodiments of the present invention by reordering the bins.

A progressive histogram may include feature information of data (i.e., an image). Embodiments of the present invention relate to reordering bins of a histogram according to the order of importance and transferring the reordered histogram in that order. By utilizing a progressive histogram, effective retrieval can be executed by only transferring portions of a histogram, regardless of whether the transfer of the histogram data is interrupted. Additionally, a high retrieval performance can be ensured only by using these parts of the histogram. The reason of which is that a certain degree of multimedia object retrieval is made possible by using these parts of bins since bins transferred earlier are more important bins.

Embodiments of the present invention is a method for statically calculating the discrimination ability of each bin. In some embodiments, discriminating data is according to a sample group of data and considering a bin having larger discrimination ability as a more important bin. With respect to the decision of the discrimination ability, the variance of values for each bin in the sample group is calculated and thus it is considered that a bin having a larger variance indicates a more important bin. In some embodiments, if data contained in the sample group is classified into groups by similarity, it can be determined that bins having a smaller variance in the same group but having a larger variance between data in other groups are more important bins. The effectiveness of these embodiments was verified by the Applicants through experimentation.

Embodiments of the present invention relate to a method for considering the importance of a bin by considering the features of a color space without using a sample group. For example, in the circumstance that a color is quantized by M sections in a color space, the importance of each quantized color can be found roughly by preliminary knowledge according to chromaticity, fineness and brightness. The Applicants have found that a region with a lower fineness has a more important effect upon retrieval as compared to an area with a higher fineness. Accordingly, if a color space is divided based on its fineness, segments with a larger fineness are less important than the segment with a lower fineness. Hence, as bins belong to an area with a lower fineness, they are more important. Accordingly, in the reordering of bins of a histogram, bins corresponding to areas of a lower fineness are positioned at the front. For example, it is assumed that there exist two areas S1 and S2 mainly according to fineness. Assuming that S1 is a fineness area lower than S2 and the ratio of importance of S1 to S2 is 2:1. When segments to be positioned at the front side are selected in priority in order to decide the bin order of the histogram, the bin order can be decided in such a manner that two one S2 are selected when S1s are selected.

According to embodiments of the present invention, in data retrieval using a color histogram, there may be a progressive color histogram which is reconfigured in the order of importance of bins. These embodiments allow for retrieval using only progressive parts at the front side made possible based on the order of access of the histogram. Accordingly, embodiments of the present invention relate to a progressive multimedia retrieval method for performing retrieval using only parts of the histogram according to the use and environment of retrieval. In embodiments of the present invention, the reconfiguration of the histogram in the order of importance of bins is considered that bins having a larger variance are more important bins by means of calculation based on the variance of bin values for each bin calculated from a sample group.

In embodiments of the present invention, the reconfiguration of the histogram in the order of importance of bins, it is considered that bins having a smaller variance in its group but having a larger variance between other groups are more important bins by means of calculation of the variance of each bin in its group and the variance of each bin between other groups from the sample group which is classified into groups by similarity of images.

In embodiments of the present invention, the reconfiguration of the histogram in the order of importance of bins is configured by sampling bins meaning the segmental regions segmented by quantization of a color space in which a segmental region having a low fineness is selected with high probability and appeared in the front part of the histogram. In exemplary embodiments of the present invention, when the color histogram uses a color space of HMMD configured by Hue. Accordingly, SUM(MAX(RGB)+MIN(RGB)), DIFF(MAX(RGB)−MIN(RGB)), and the HMMD color space may have a range of DIFF values of 0-255. The designated DIFF values for segmenting on the basis of the shaft of DIFF are 9, 29, 75, and 200. The five segmental regions segmented on the basis of the DIFF values are S1, S2, S3, S4, and S5, respectively. The five segmental regions are configured as 184 bins by using a color quantization method in which S1 is segmented by 8 on the basis of SUM. S2 is segmented by 4 on the basis of SUM and by 8 on the basis of Hue. S3 is segmented by 4 on the basis of SUM and by 12 on the basis of Hue. S4 is segmented by 4 on the basis of SUM and by 12 on the basis of Hue. S5 is segmented by 2 on the basis of SUM and by 24 on the basis of Hue. In embodiments, the sampling probabilities at the regions of S1, S2, S3, S4, and S5, respectively, are decided on 24:12:6:2:1 in order to make the sampling probabilities differ.

In embodiments, a data retrieval system may include at least one of the following steps. Transferring the histogram to a client. Retrieving the histogram by using the histogram in part or whole from the front part of the histogram according to a retrieval object and a hardware environment of the client for the retrieval. In embodiments, a method comprises retrieving, only using the received histogram data, when the histogram data of the query data is interrupted by unexpected results in transfer.

In embodiments, a progressive color histogram includes bin order information in a retrieving engine capable of retrieving by using a progressive part which comes at the lead on the basis of the transfer order of histogram (bit stream), retrieves by using the partial bin of the color histogram and the bin order information, selects and uses a bin according to the order of importance of bins.

In embodiments the configuration of a histogram in the order of importance of bins considers that bins having a larger variance are more important bin by means of calculation based on the variance of bin values for each bin calculated from a sample group. In embodiments, the configuration of the histogram in the order of importance of bins considers that bins having a smaller variance in its group but having a larger variance between other groups are more important bins by means of calculation of the variance of each bin in its group and the variance of each bin between other groups from the sample group which is classified into groups by similarity of images. In embodiments, the configuration of the histogram in the order of importance of bins is configured by sampling bins meaning the segmental regions segmented by quantization of a color space in which a segmental region having a low fineness is selected with high probability and appeared in the front part of the histogram.

In embodiments a histogram uses a color space of HMMD configured by Hue, SUM(MAX(RGB)+MIN(RGB)), and DIFF (MAX(RGB)−MIN(RGB)). The HMMD color space has the range of DIFF values of 0-255. The designated DIFF values for segmenting on the basis of the shaft of DIFF are 9, 29, 75, and 200. The five segmental regions segmented on the basis of the DIFF values are S1, S2, S3, S4, and S5, respectively. The five segmental regions are configured as 184 bins by using a color quantization method in which S1 is segmented by 8 on the basis of SUM. S2 is segmented by 4 on the basis of SUM and by 8 on the basis of Hue. S3 is segmented by 4 on the basis of SUM and by 12 on the basis of Hue. S4 is segmented by 4 on the basis of SUM and by 12 on the basis of Hue. S5 is segmented by 2 on the basis of SUM and by 24 on the basis of Hue. In some embodiments, the sampling probabilities at the regions of S1, S2, S3, S4, and S5, respectively are decided on 24:12:6:2:1 in order to make the sampling probabilities differ.

In embodiments, a method comprises at least one of the following steps. Transferring the histogram to a client. Retrieving the histogram. Using the histogram in part or whole from the front part of the histogram according to a retrieval object and a hardware environment of the client for the retrieval.

In embodiments, a method comprises at least one of the following steps. Reconfiguring a query histogram and a retrieval target histogram according to the respective bin order information. Comparing/retrieving the histogram reconfigured that an important bin comes at the lead according to the bin order information.

Embodiments of the present invention relate to a method comprising at least one of the following steps. Selecting a query histogram and a retrieval target histogram one by one according to the bin order information. Comparing/retrieving the color histogram according to the bin order.

In embodiments, a multimedia retrieval is performed by using a progressive histogram optimized according to intrinsic feature of the corresponding object at every multimedia data. Optimization means that the importance configuring the corresponding histogram is different according to the viewpoints of comparing/retrieving.

FIG. 1 illustrates one example of the application of the present invention. It is assumed that, in image retrieval using query images in a network environment, the transfer of a histogram 101 corresponding to the query images is interrupted before the entire histogram arrives, and thus the histogram is received up to P1. A client similarly calculates using a histogram received up to P1 and using only bins at the same position as the histogram of a target image 102. Accordingly, even if only parts of the histogram are used, a certain degree of retrieval performance is ensured, for thereby enabling a more effective retrieval.

Figure 2:
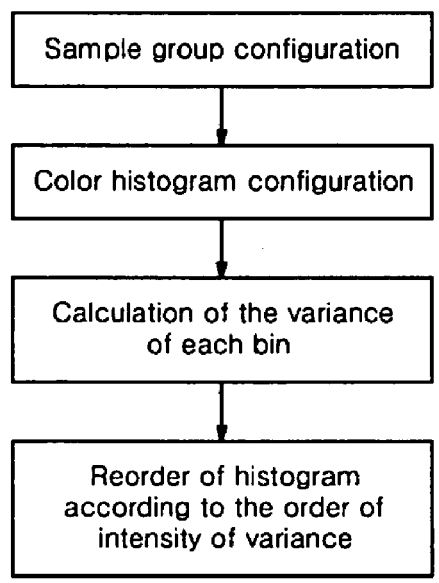
FIG. 2 is an exemplary flow chart explaining a method for reconfiguring a histogram.

FIG. 2 illustrates an exemplary method for reconfiguring bins of a histogram generated by a general method in the order of importance so that retrieval performance is not lowered drastically even if only parts of the histogram are used. Firstly, a sample group of various data is configured, and then a histogram of data corresponding to the configured sample group is generated. Then, the variance of each bin of the generated color histogram is calculated and thereafter the histogram is reordered in the order of intensity of variance.

Figure 3:
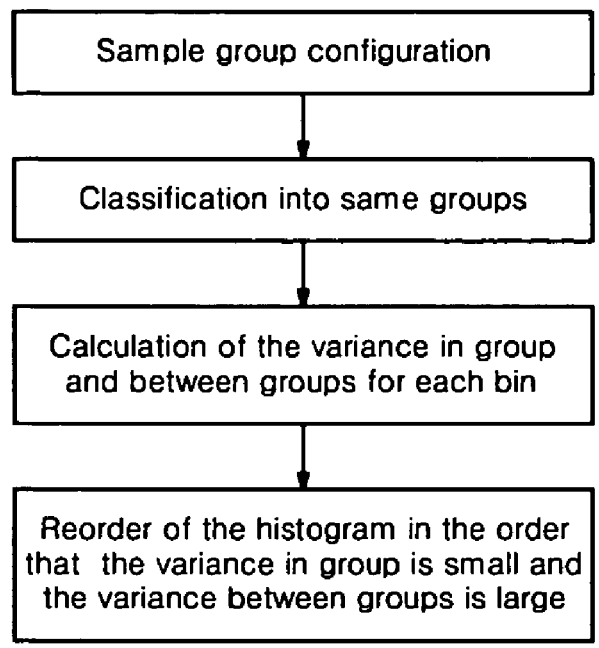
FIG. 3 is an exemplary flow chart explaining a method for reconfiguring a histogram.

FIG. 3 illustrates another example of reordering bins of a histogram generated by a general method of ordering bins in order of importance. First, a sample group of various data is configured and then is classified into groups by using preliminary information on data of a similar type. The histogram of data corresponding to the configured sample group is generated. The variance in group for histograms of data in the same group and the variance between groups for histograms of data in different groups are then calculated. The histogram is then reordered in the order that the variance in group is small and the variance between groups is large.

Figure 4:
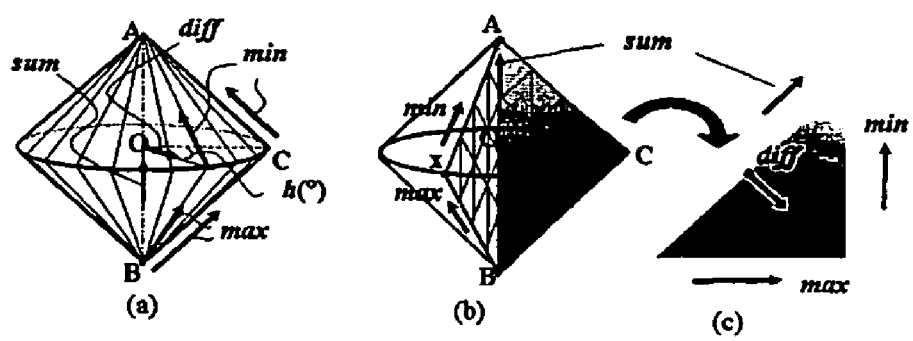
FIG. 4 is a view illustrating a HMMD color space as an example of a color space.

FIG. 4 illustrates a HMMD color space for explaining a progressive color histogram using the HMMD color space according to an embodiment of the present invention. The HMMD color space is a color space of a double cone shape. The HMMD color space is described in U.S. application Ser. No. 09/239,773 filed Apr. 29, 1999 and Ser. No. 09/865,459 filed May 29, 2001, which is assigned to the same entity, and the entire disclosure thereof is incorporated herein by reference. The central axis thereof is represented as SUM ([MAX(RGB)+MIN(RGB)]/2), which corresponds to brightness. Fineness is increased in the order of center to peripheral sides of the cone, which is represented as DIFF (MAX(RGB)−MIN(RGB)). The angle of the cone indicates a color, which is generally represented as Hue.

Figures 5, 6:
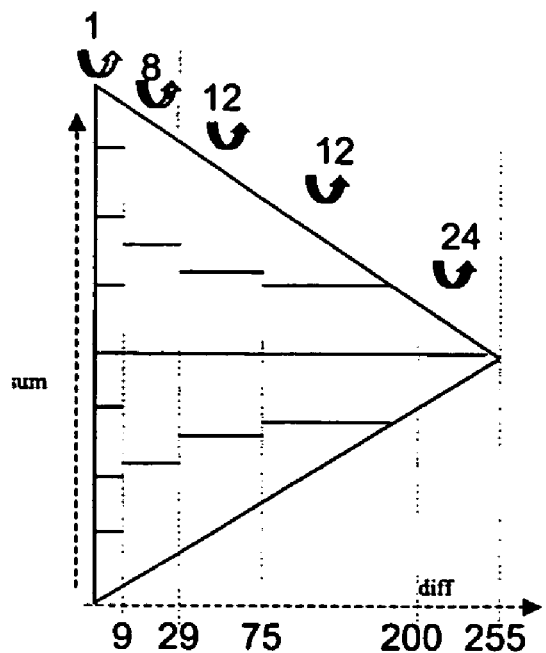
FIG. 5 is a view explaining an exemplary 184 level quantization method viewed in a HMMD cross-section.
FIG. 6 is an exemplary view illustrating reordered information of a color histogram consisting 184 bins.

FIG. 5 illustrates an example of quantization of the HMMD color space explained in FIG. 4 by 184 levels. As illustrated therein, the HMMD color space is divided into 5 partial areas based on DIFF and then is subdivided into 184 segments. These segments generate a color histogram formed of 184 bins.

FIG. 6 illustrates reorder information generated when the 184 level color histogram described in FIG. 5 is divided into 5 partial areas based on DIFF and then the color histogram is reordered by sampling bins in each partial area in the probability ratio of 24:12:6:2:1. The sampling of bins means reordering of the color histogram in the order of selection of 184 bins with a particular probability. Thus, the bin firstly selected by sampling must be the most important bin. Therefore, if a bin has a high probability, it has a high sampling probability by priority and thus it is more likely to be positioned at the front in reordering. For example, two partial areas having the lowest fineness consists of 8 segments and 32 segments respectively as shown in FIG. 5. In embodiments of the present invention, the probability ratio is 24:12. Accordingly, one bin is sampled from 2 bins in the first area, and then one bin is sampled from four bins in the next area, for thereby sampling four bins in the first area and 8 bins in the next area.

FIG. 7 illustrates exemplary changes in performance when using 16 bins, 32 bins, 64 bins, and 128 bins in a progressive color histogram according to embodiments of the present invention. At this time, when N bins are used, a bin value is not represented by a decimal, but is quantized and represented by n bits for spatial efficiency. For example, the representation of a bin value by 1 bit indicates the representation of a decimal between 0 and 1 by 0 or 1 based on a particular threshold. Thus, in the case that a bin value is represented by 1 bit and the color histogram consists of 16 bins, the total number of bits of the histogram information used in retrieval is 16. In this experiment, retrieval performance is obtained by representing a bin value by 1 bit, 2 bits and 4 bits for each selected number of bins. In FIG. 7, a first string is indicative of a selected number of bins. A third string is indicative of how many bits of the histogram information are used by representing the bin value by n bits (that is, it is indicated that the bin value is also quantized). A middle string is indicative of performance. The same number of bins is represented by 4 bits, 2 bits and 1 bit, respectively. For example, bin number 184 is represented by 4 bits (total number of bits 736), by 2 bits (total number of bits 368) and by 1 bit (total number of 184). In the middle string, the smaller the number of bits is, the more excellent the performance indicated by the middle string is. As illustrated in the drawing, the representation of a bin value by only 4 bits is adequate for achieving a high performance. The smaller the number of bins used for retrieval in the entire color histogram is, the lower the performance is. However, the width of the drop is not so large.

As described above, a method for reordering bins of the histogram in the order of importance may be obtained by statically analyzing the histogram of large quantity of data. However, there may be a lot of data, and thus even if a bin is so important in a particular data group, it may be less important in another data group. Thus, it is possible to achieve a higher retrieval performance by using a histogram optimized for each data and configured in a different bin order based on the features of each data.

For reordering of bins, a statistical method may be used for common application regardless of the type of data. However, in this case, the respective characteristic features of each data cannot be reflected, and thus there is a certain limitation in the performance. Therefore, in order to generate more optimized progressive histogram, it is necessary to generate and use a different progressive histogram conforming to the features of each data object, for thereby achieving a retrieval optimized for each data object. Here, the different progressive histogram conforming to the features is indicative of a histogram reordered in the order of importance in consideration of the features of each data. That is, it is a histogram reordered according to the features of data. Thus, in this case, the order of bins configuring the histogram is varied dependant upon each data object. In order to configure such an optimized progressive histogram, it is necessary to calculate the importance of each bin for comparative comparison of each data object. Accordingly, the importance of bins of each data can be calculated by using a user feedback or using group information if those bins have bin grouped.

An exemplary method using a user feedback is described below. The user feedback means that a user informs a system of information about similar objects and dissimilar objects based on the result of retrieval as a feedback when retrieving a similar object upon a query of a corresponding object. For example, in case of image retrieval, a user may inform a system of images similar to images that he or she seeks and what images dissimilar to the images that he or she seeks are based on the result of initial retrieval (user feedback). The system thusly having received the user feedback can calculate the importance of each bin of the histogram of the corresponding object by using feedback information about similarity and dissimilarity.

The exemplary method for calculating the importance $w_i$ of bin i is as follows.

$$w_i = a f_I(i) + b f_R(i)$$

Here, a and b are constants, $f_I(i)=(pm_i)/qv_i$ (similarity between similar images for bin i), $f_R(i)=pm_i \times qv_i$ (dissimilarity between dissimilar images for bin i), p and q are constants, mi is the average of bin i values in the corresponding image group, vi is the variance of bin i values in the corresponding image group. With respect to the above-described importance wi of bin I, in the case that feedback images are only similar images or only dissimilar images, the importance of each element can be calculated by setting one of a and b as 0.

Figure 8:
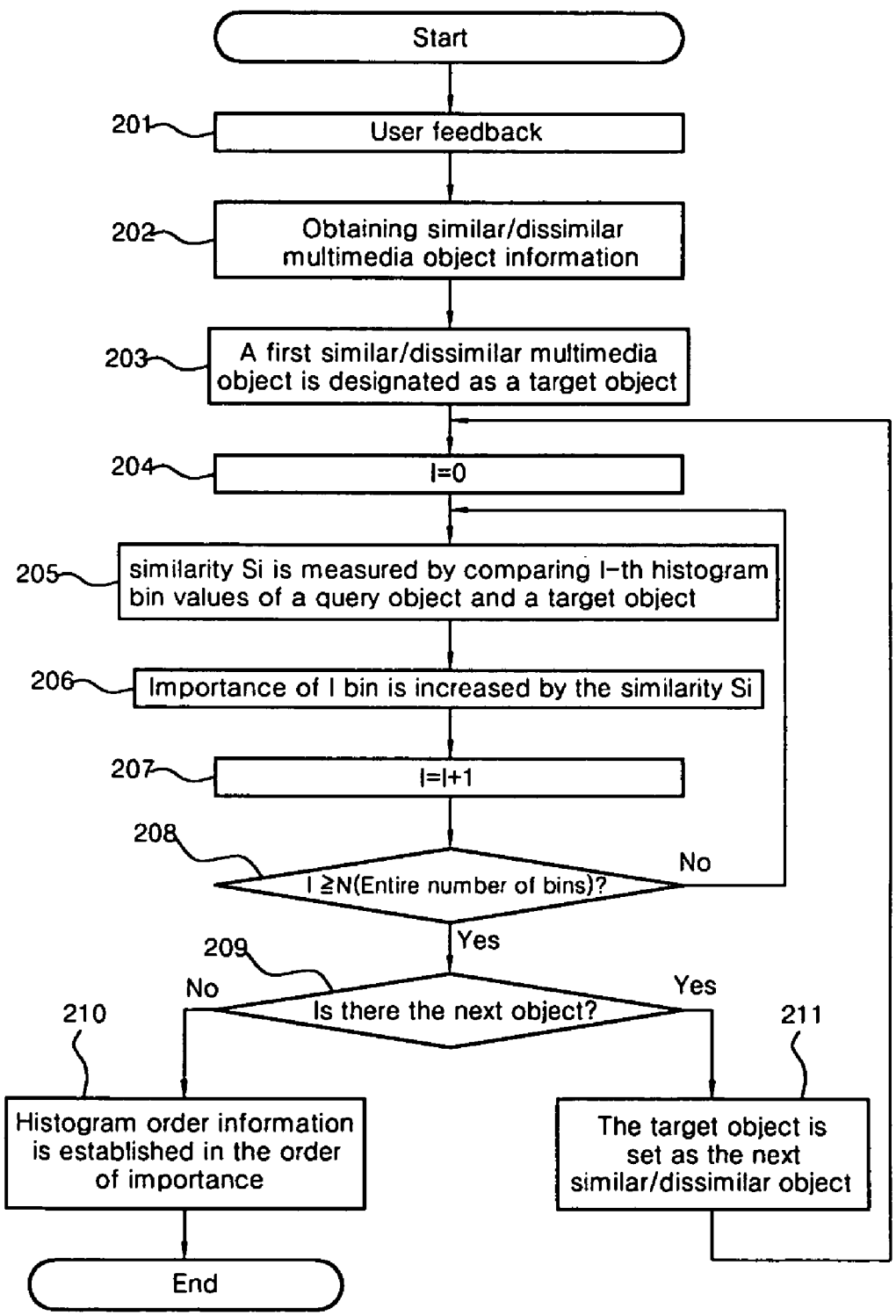
FIG. 8 is an exemplary flow chart illustrating a method for obtaining reorder information of a color histogram.

FIG. 8 illustrates an exemplary order of obtaining reorder information of a histogram using a user feedback so that retrieval performance is not so lowered even if only parts of the histogram are used. In this method, information about similar objects of the objects to be reordered are received from the user feedback, and thereafter the similarity between similar objects and the corresponding bin are measured for each bin of the histogram. In proportion to the similarity thusly calculated, the importance of each bins is increased. Then, when the importance of every bins is calculated for every similar objects, the reorder information of those bins are calculated in the order of importance of every bins.

In FIG. 8, step 201 is a step for receiving a feedback (information about similarity or dissimilarity) for the result of initial retrieval from a user. Step 202 is a step for obtaining similar/dissimilar data object information according to the user feedback. In step 203, a first similar/dissimilar data object is designated as a target object. In step 204, I bin is set as 0. In step 205, similarity S1 is measured by comparing I-th histogram bin values of a query object and a target object. In step 206, the importance of I bin is increased by the similarity S1. A series of steps for measuring the similarity and increasing the importance of I bin by the measured similarity are repeated until I reaches the total number of bins in steps 207 and 208. In this way, the generation of the importance of I bin for the corresponding object is completed. Then, if there is no next object, histogram order information is established in the above order of importance in steps 209 and 210. If there is the next object, the target object is set as the next similar/dissimilar object, and the steps for measuring the similarity S1 and generating the importance are repeated by beginning with I bin=0 in steps 209 and 211.

An exemplary method for using grouping information is discussed below. For more effective multimedia retrieval, grouping information of other multimedia objects in the same class can be included for each multimedia object. On the other hand, multimedia objects in a particular database can be grouped by class. In this manner, if there is information about groups of the same class, the importance of each bin can be automatically calculated by using this information. That is, multimedia objects in the same class are identical to the feedback information about similar objects from the above-described user feedback. Thus, the importance of a bin can be calculated by applying the above-described importance $w_i$ calculation method to the histogram of these objects in the same way.

Figure 9:
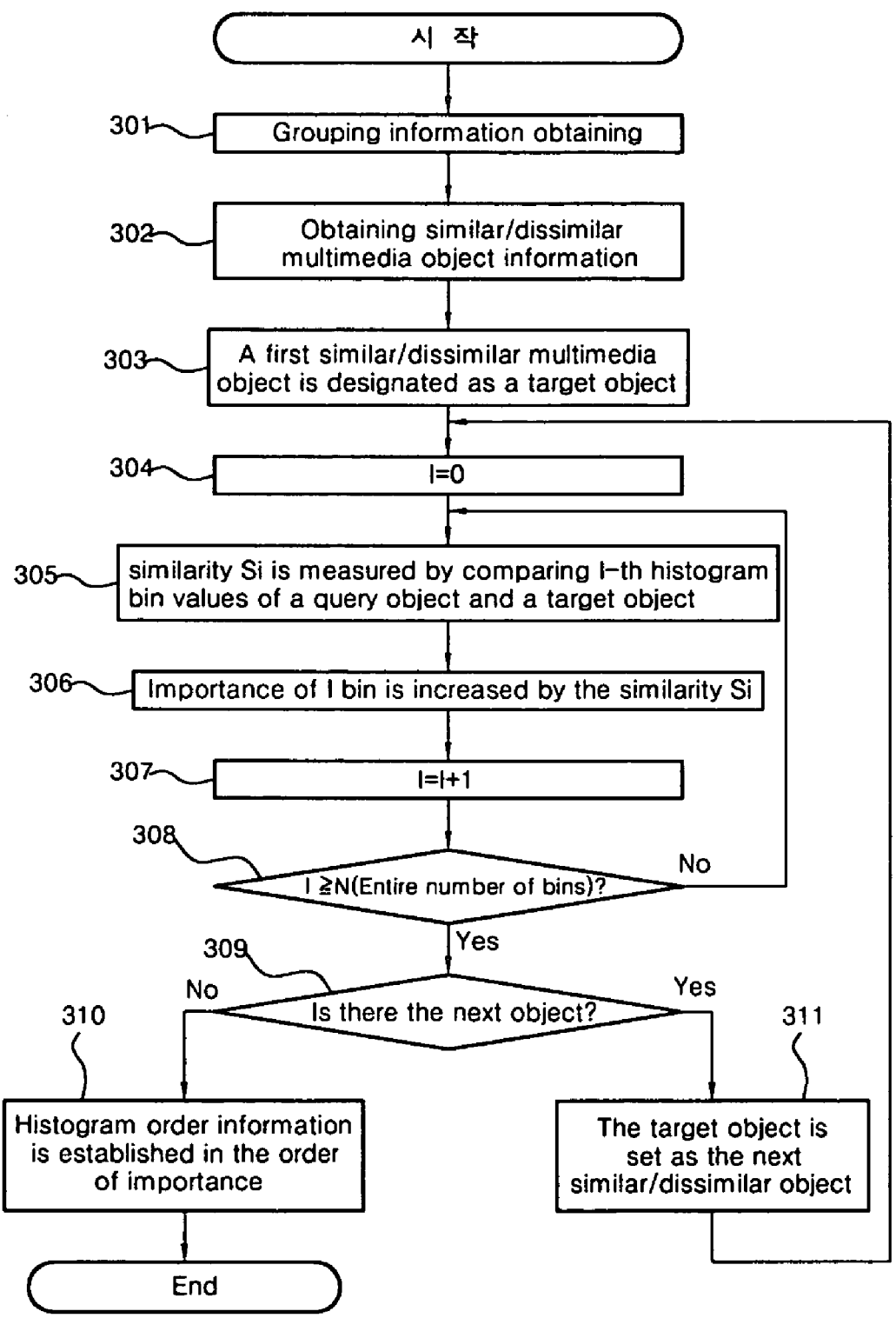
FIG. 9 is an exemplary flow chart illustrating a method for obtaining reordered information of a histogram.

FIG. 9 illustrates an order of an exemplary method for using grouping information in place of a user feedback as another method for obtaining reorder information of a histogram. In this method, information about similar objects of the object to be reordered is received from group information previously configured in step 301. The subsequent steps are identical to the ones of the method described in FIG. 8. That is, information about similar objects of the object to be reordered are received from group information previously configures, and then similar/dissimilar object information are obtained in step 302. A first similar/dissimilar multimedia object is designated as a target object in step 303. The similarity between bins of the histogram I=0 through N is measured and then the importance of the corresponding I bin is increased by the similarity Si in steps 304 through 308. If there is no next object, histogram order information is established in the above order of importance in steps 309 and 310. If there is the next object, the steps are repeated starting from 304 in steps 309 and 311.

In order to compare and retrieve the produced histogram, as described above, order information representing that the bin is reordered on what importance and on what order is required. For example, calculation of similarities of two images will be described by using histogram. In this case, since the order of two histograms is differ, bin order information is required as feature information of the histogram in order to compare among the bins, in which a mapping is performed. Even though the order of the histogram is different, it is possible to compare among the reordered bins according to importance.

FIG. 10 illustrates a feature information structure of an exemplary multimedia object formed of histogram and reorder information. A feature information structure 400 has a histogram information 401 as feature information of the multimedia and a reorder information structure 402 representing that the order of each bin of the histogram is arranged on what importance. The reorder information is a one dimensional matrix type in which the order of each bin of the histogram is arranged.

According to the present invention, in the multimedia retrieving using a color histogram, it is possible to perform the high retrieving capacity even though the partial histogram is compared and retrieved. Especially, when the data transfer is interrupted in transferring the histogram of data, high retrieving capacity is guaranteed even though only the received part is retrieved.

Also, according to embodiments of the present invention, there is an advantage that a server having data discriminates whether the histogram is transmitted partially or wholly according to an object of retrieval and the environment of a client and a network, thereby capable of performing an optimum retrieval at every case. Also, according to embodiments of the present invention, there is an effect that a progressive histogram optimized according to the feature of every object is used, so that a high retrieval capacity is possible even though the comparison and retrieval are performed by using a partial histogram. Especially, according to the present invention, a different feature on each object is considered to the reorder information, thereby providing a very high capacity and an object-oriented retrieving service.

Embodiments relate to a histogram in which a relatively important bin comes at the lead of the access on the basis of the access order of time series grounds in order to retrieve multimedia using the histogram. The histogram may be a color histogram.

Embodiments relate to a progressive multimedia retrieval method including at least one of the following steps. Reconfiguring a color histogram that a relatively important bin comes at the lead of the access when accessing histogram data for retrieving. Comparing/retrieving a query color histogram and a retrieval target color histogram according to the order of importance of bins, when accessing and then comparing/retrieving the color histogram reconfigured as the order of importance, the access order reconfigured as the order of importance. In embodiments, the comparison and retrieval of the query histogram and the retrieval target color histogram are performed as information having the meaning that the progressive part, which comes at the lead relatively, represents the whole corresponding color histogram, when accessing the color histogram reconfigured as the order of importance. In embodiments, reconfiguration of the histogram in the order of importance of bins is considered that bins having a larger variance are more important bin by means of calculation based on the variance of bin values for each bin calculated from a sample group.

In embodiments, the reconfiguration of the histogram in the order of importance of bins is considered that bins having a smaller variance in its group but having a larger variance between other groups are more important bins by means of calculation of the variance of each bin in its group and the variance of each bin between other groups from the sample group which is classified into groups by similarity of images. In embodiments, histogram in the order of importance of bins is configured by sampling bins meaning the segmental regions segmented by quantization of a color space in which a segmental region having a low fineness is selected with high probability and appeared in the front part of the histogram.

In embodiments, a histogram uses a color space of HMMD configured by Hue, SUM(MAX(RGB)+MIN (RGB)), DIFF (RGB)−MIN(RGB)). The HMMD color space has the range of DIFF values of 0–255 and the designated DIFF values for segmenting on the basis of the shaft of DIFF are 9, 29, 75, and 200 and the five segmental regions segmented on the basis of the DIFF values are S1, S2, S3, S4, and S5, respectively, the five segmental regions are configured as 184 bins by using a color quantization method in which S1 is segmented by 8 on the basis of SUM, S2 is segmented by 4 on the basis of SUM and by 8 on the basis of Hue, S3 is segmented by 4 on the basis of SUM and by 12 on the basis of Hue, S4 is segmented by 4 on the basis of SUM and by 12 on the basis of Hue, and S5 is segmented by 2 on the basis of SUM and by 24 on the basis of Hue. In some embodiments, the sampling probabilities at the regions of S1, S2, S3, S4, and S5, respectively, are decided on 24:12:6:2:1 in order to make the sampling probabilities differ.

In embodiments, a method comprises a step of transferring the histogram to a client or retrieving the histogram by using the histogram in part or whole from the front part of the histogram according to a retrieval object and a hardware environment of the client for the retrieval. In embodiments, a method comprises retrieving by only using the received histogram data, when the histogram data of the query data is interrupted by unexpected results in transfer.

In embodiments, a histogram information representation structure comprises bin order information deciding an order that a relatively important bin comes at the lead of the access in the access order of time series grounds in order to query using the histogram.

Embodiments relate to a multimedia retrieval method using a progressive histogram comprising the following steps. Producing bin order information deciding an access order that a relatively important bin comes at the lead of the access when accessing histogram data for retrieving in the multimedia retrieval using the progressive color histogram. Retrieving partial bin of the color histogram by using the bin order information. Comparing/retrieving the color histogram by selecting the bin according to the order of importance of bins. In some embodiments, the method further comprises transferring the histogram to a client or retrieving the histogram by using the histogram in part of whole form the front part of the histogram according to a retrieval object and a hardware environment of the client for the retrieval.

In some embodiments, a comprises the following steps. Reconfiguring a query histogram and a retrieval target histogram according to the respective bin order information.

Comparing/retrieving the histogram reconfigured that an important bin comes at the lead according to the bin order information.

In some embodiments, a method further comprises the following steps. Selecting a query histogram and a retrieval target histogram one by one according to the bin order information. Comparing/retrieving the color histogram according to the bin order.

Embodiments of the present invention relate to a multimedia retrieval method using a progressive color histogram comprising the following steps. Calculating importance of bins configuring the corresponding histogram in each multimedia object, in which the importance is differ according to the viewpoints of comparing/retrieving, when calculating the importance of bins configuring histogram as feature information for retrieving multimedia. Comparing/retrieving the histogram according to the order of importance by using the calculated information of importance according to the viewpoints of comparing/retrieving. Some embodiments comprise the step of calculating the information of importance of bins according to the viewpoints of comparing/retrieving on the basis of user's feedback information to similarity or dissimilarity or on the basis of group information to a similarity object obtained in advance. In some embodiments, the histogram is transmitted by the order of importance of binds and the partial histogram or the whole histogram is transmitted according to the situation of a system or network.

Embodiments relate to a method for configuring progressive histogram information comprising the following steps. Producing importance of bins configuring the histogram as feature information for retrieving multimedia by considering the feature according to the viewpoints of comparing/retrieving, in which the importance is differ in each multimedia object. Producing and storing the order information of bin of the histogram.

In the embodiments, the order information of bin of the histogram is a one-dimensional matrix type arranged the order of each bin of histogram.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:
   receiving or sending data,
   wherein the data includes a chart,
   wherein the chart is grouped into categories,
   wherein the categories are ordered according to an ability to discriminate,
   wherein the chart is grouped into categories according to fineness, and the ability to discriminate is based upon the fineness of the categories, and
   wherein when a ratio of fineness for any two areas S1 and S2 is M:N, the categories are ordered such that M S1 areas are selected for every N area.

2. The method of claim 1, wherein a first category has a lower fineness than a second category, and wherein the first category has a better ability to discriminate than the second category.

3. An apparatus configured to receive or send data, wherein the data includes a chart, wherein the chart is grouped into categories, and wherein the categories are ordered according to ability to discriminate,
   wherein the chart is grouped into categories according to fineness, and the ability to discriminate is based upon the fineness of the categories, and
   wherein when a ratio of fineness for any two areas S1 and S2 is M:N, the categories are ordered such that M S1 areas are selected for every N area.

4. The apparatus of claim 3, wherein a first category has a lower fineness than a second category, and wherein the first category has a better ability to discriminate than the second category.

* * * * *